(12) United States Patent
Abraham et al.

(10) Patent No.: US 7,793,026 B1
(45) Date of Patent: Sep. 7, 2010

(54) COMPUTER SYSTEM WITH PERIPHERAL MODULES ATTACHED TO A DISPLAY/CPU ASSEMBLY

(75) Inventors: Benjamin Abraham, Cupertino, CA (US); Yancy Chen, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/250,047

(22) Filed: Oct. 13, 2008

(51) Int. Cl.
*G06F 13/00* (2006.01)

(52) U.S. Cl. ............. 710/303; 361/679.21; 361/679.22; 361/679.23; 361/679.41; 361/728; 361/729; 361/731

(58) Field of Classification Search .............. 710/303, 710/304; 361/679.21–679.23, 679.41, 728, 361/729, 731
See application file for complete search history.

(56) References Cited

U.S. PATENT DOCUMENTS

| 6,489,932 | B1 | 12/2002 | Chitturi et al. |
| 6,807,050 | B1 | 10/2004 | Whitehorn et al. |
| 7,093,057 | B2 * | 8/2006 | Choi ........................... 710/313 |
| 7,350,011 | B2 * | 3/2008 | Keely et al. ................. 710/303 |
| 7,587,726 | B2 * | 9/2009 | Leung ......................... 720/600 |
| 7,589,959 | B2 * | 9/2009 | Ikeda ..................... 361/679.21 |
| 2002/0095534 | A1 * | 7/2002 | Bae .............................. 710/16 |
| 2004/0150945 | A1 * | 8/2004 | Mache et al. ............... 361/683 |
| 2005/0270731 | A1 * | 12/2005 | Yin ............................. 361/681 |
| 2008/0002350 | A1 * | 1/2008 | Farrugia ..................... 361/686 |
| 2008/0091858 | A1 * | 4/2008 | Zhang et al. .................. 710/72 |

* cited by examiner

*Primary Examiner*—Glenn A Auve

(57) ABSTRACT

A modular computer includes a display with a docking station on its back side. A CPU module connects to the docking station. Peripheral modules connect with the resulting display/CPU assembly so that the peripheral modules contact the back side of the display screen.

15 Claims, 5 Drawing Sheets

COMPUTER SYSTEM WITH PERIPHERAL MODULES ATTACHED TO A DISPLAY/CPU ASSEMBLY

BACKGROUND

"All-in-one" desktop computers that integrate a large flat-screen monitor provide a relatively uncluttered desktop to enhance a user's computer experience. Where a conventional computer system requires at least a computing unit and a display, respective power cords, and a video cable, an all-in-one computer requires only one integrated component and a power cord.

Conventional computers with separate computing units and monitors permit a computing unit to be replaced while the monitor is retained, and vice-versa. In the case of a typical all-in-one computer, replacing the computing unit requires replacing the monitor and vice versa. Thus, if the computing unit fails or needs to be upgraded, a still fully functional monitor may need to be replaced along with the CPU. Accordingly, prospective customers desiring the elegance of an all-in-one computer may elect instead to accept the clutter associated with a conventional computer to avail themselves of the more convenient and cost-effective repair and upgrade possibilities.

BRIEF DESCRIPTION OF THE DRAWINGS

The features and advantages of the embodiments as well as additional features and advantages thereof will be more clearly understood hereinafter as a result of a detailed description of the preferred embodiments of the invention when taken in conjunction with the following drawings in which.

DETAILED DESCRIPTION

The embodiments described herein provide for a computer in which the rear of the display serves as a foundation for supporting plural modules. The display provides structural support, power, and image input from the modules. The result is a system that has the uncluttered feel of an all-in-one computer, but with more convenient customization, repair, and upgrading.

Figure 1:
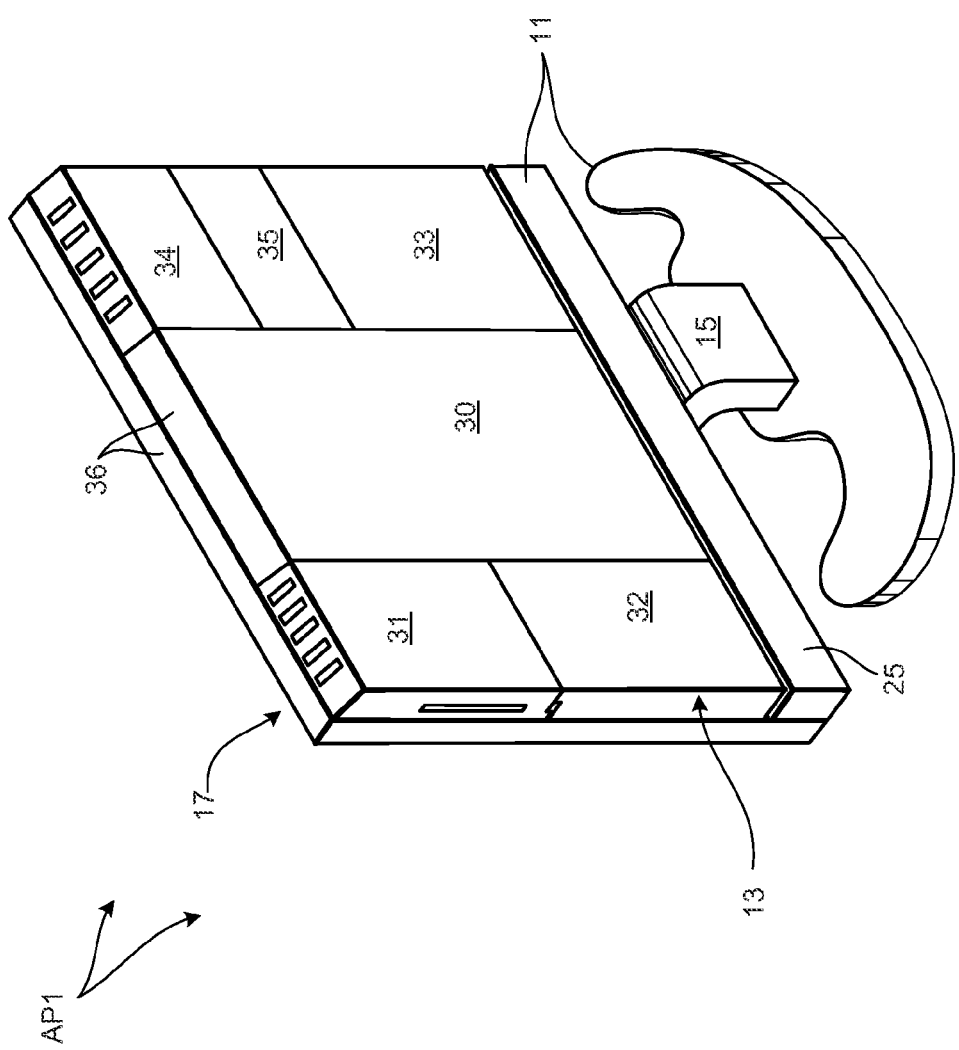
FIG. 1 is a schematic perspective view of a modular all-in-one computer in accordance with an embodiment of the invention.
Figure 2:
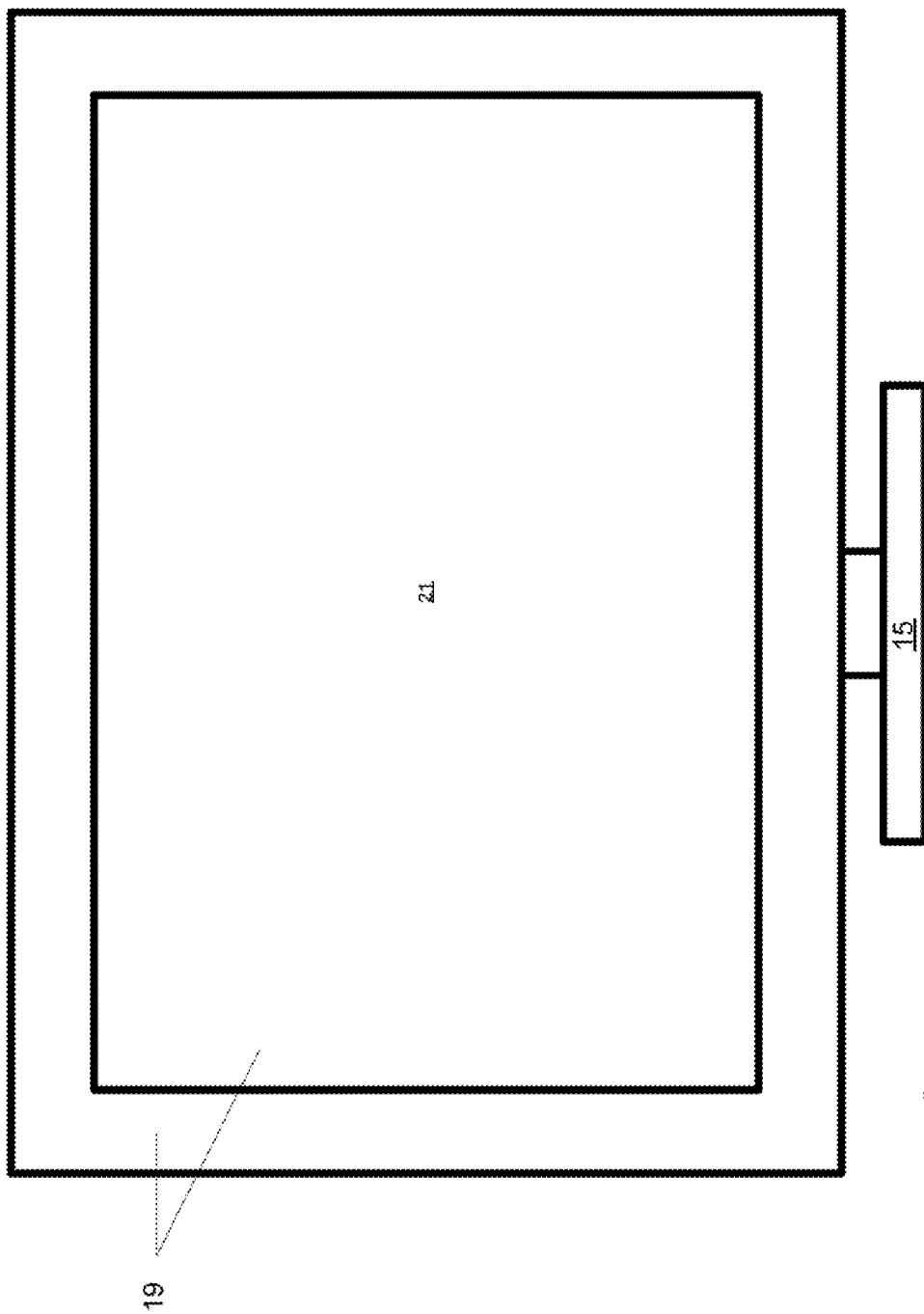
FIG. 2 is a schematic front view of the system of FIG. 1.

A modular computer AP1 comprises a display assembly 11 and a processing slice 13, as shown in FIG. 1. Display assembly 11 includes a support structure, namely stand 15, and a display 17. Display 17 has a front side 19 with a display screen 21 (shown in FIG. 2) and a rear side 23 (best seen in FIG. 3). Rear side 23 includes a docking bar 25, which provides for display 17 serving as a docking station. Processing slice 13 includes a CPU module 30, a hard disk module 31, a graphics module 32 including a graphics processor, an optical drive module 33, an I/O module 34, and a TV tuner module 35. Graphics module 32 (FIGS. 1 and 3), receives instructions from the CPU module 30, generates images and communicates them through CPU module 30, which forwards them to display 27 to be presented on screen 21.

Figure 3:
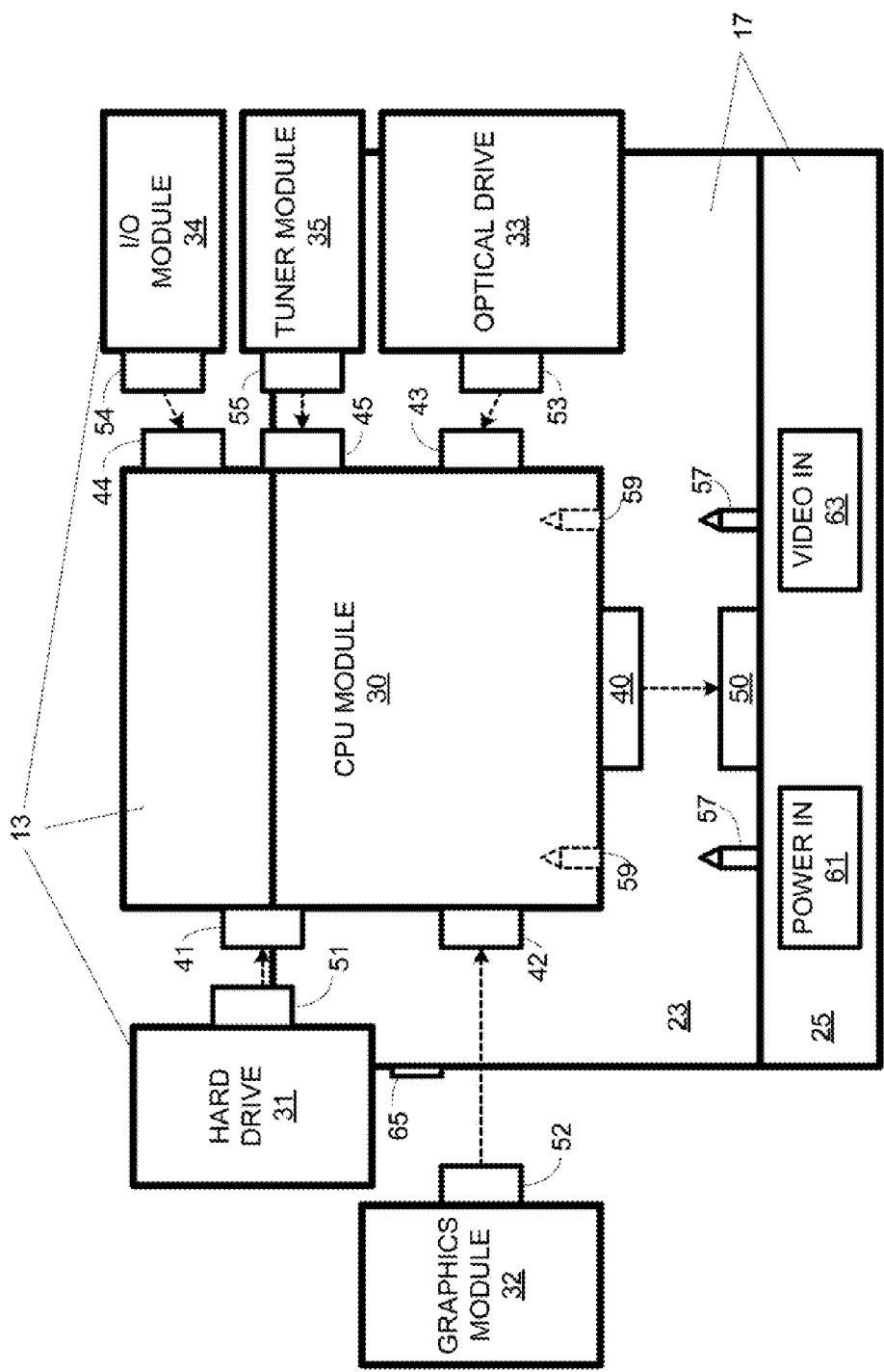
FIG. 3 is a schematic exploded view of the modular computer system of FIG. 1.

As indicated in FIG. 3, CPU module 30 plugs vertically into docking bar 25, to define a CPU/display assembly 36 (FIG. 1). Peripheral modules 31-35 engage CPU/display assembly 36 and CPU module 30 laterally. CPU module 30 includes a CPU docking connector 40 and peripheral docking connectors 41-45, which mate respectively to connectors 50-55 of docking bar 25 and peripheral modules 31-35 to define rigid cable-less connections. Guide pins 57 of docking bar 25 mate with corresponding holes 59 of CPU module 30 to ensure alignment of connectors 40 and 50 during installation of CPU module 30. In an alternative embodiment, peripheral modules connect directly to a display, through which they communicate with a CPU module. In that and the illustrated case, the module connections and interconnections are rigid and cableless.

Docking bar 25 includes a power-in connector 61 and a video-in connector 63. AC power is provided, e.g., from a wall outlet, to computer AP1 via power input connector 61. Docking bar 25 includes a power supply that can be a replaceable module that converts the received AC power to DC, which is converted to suitable voltages and distributed for use by display 17, CPU module 30, and peripheral modules 31-35.

Video-in connector 63 is positioned on the back of docking bar 25 so that it is accessible even when CPU module 30 and peripheral modules 31-35 are attached. Video-in connector 63 can receive a video signal from a separate computer so that display 17 can be used as a monitor even when no modules are attached thereto. Display 17 includes a source selector switch 65 that can be a manual switch or an electronic switch for selecting between the external computer coupled to video input 63 and CPU module 30 when both are connected to display 17.

Figure 4:
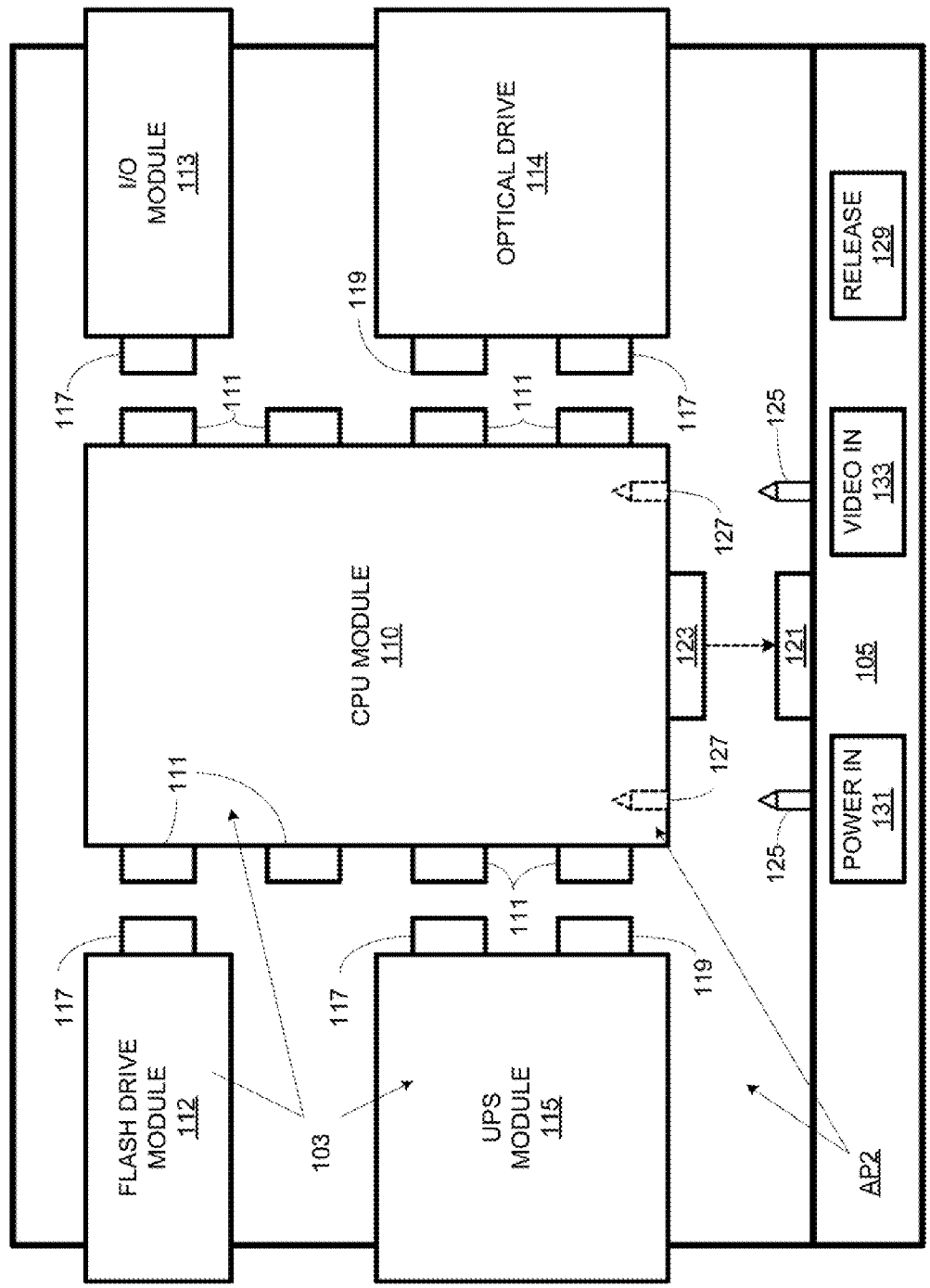
FIG. 4 is a schematic exploded view of an alternative modular all-in-one system.

A computer system AP2, represented in FIG. 4, takes modularity a step further by employing a uniform form factor for peripheral modules. System AP2 includes a display 101 and a processing slice 103. Display 101 includes a screen on its front side and a docking bar 105 on its back side (the side shown in FIG. 4). A CPU module 110 can be physically attached to and electrically connected to docking bar 105.

CPU module 110 has evenly spaced and identical trapezoidal connectors 111 so that there is room for four single-width modules, e.g., flash drive module 112 and I/O module 113, per lateral side of CPU module 110. Double-width modules, e.g., an optical drive module 114 and a UPS (uninterruptible power supply) module 115 are accommodated using matching pairs of connectors. All peripheral modules, e.g., modules 112-115, include active connector 117 for rigid cableless connectivity with CPU module 110. Double-width modules 114 and 115 also include passive (terminator) connectors 119 for additional physical support, but they do not provide for electrically connectivity. Connectors 111, 117, and 119 are trapezoidal to provide lateral symmetry and vertical asymmetry. This allows peripheral modules to be used on either side of CPU module 110 while preventing inverted installations.

Docking bar 105 includes a connector 121 for mating with a respective connector 123 of CPU module 110. To aid in alignment during installation of CPU module 110, docking bar 105 is provided with guide pins 125 to mate with guide holes 127 of CPU module 110. Once installation is complete, guide pins 125 lock to guide holes 127. A release 129 is provided to unlock CPU module 110 from docking bar 25 when removing CPU module 110. A power-in connector 131 is provided for receiving AC power, and a video-in connector 133 is provided for receiving a video input signal from a separate computer.

Figure 5:
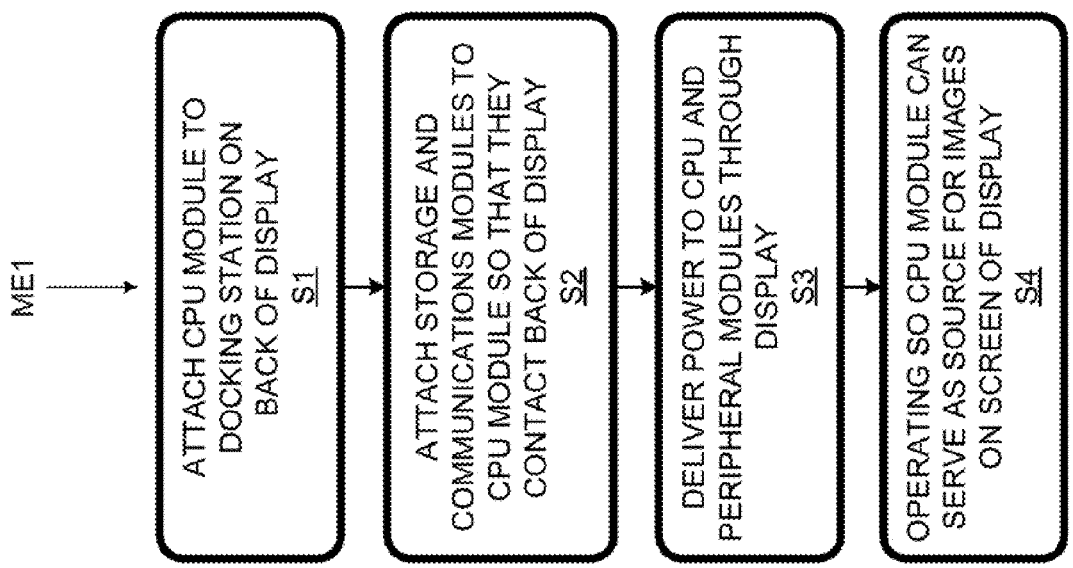
FIG. 5 is a flow chart of a method of using the modular computers of FIGS. 1 and 4.

Turning to FIG. 5, a method MD in accordance with an embodiment of the invention provides for attaching a CPU module to a display so that they are rigidly and physically attached and electrically connected to the display at step S1. At step S2, peripheral modules are attached to the display/CPU assembly resulting from step S1 so that the peripheral modules contact the display and are electrically connected to the display/CPU assembly. At step S3, power is supplied to peripheral modules through the display. In the illustrated embodiments, power is supplied to peripheral modules through the display via the CPU module. At step S4, images generated by the resulting processor slice are presented on the display.

Herein, a "CPU module" is a module that contains a data processor, memory, and communications devices all connected via a system bus. A "hard disk module" is a module that includes one or more storage disks. A "graphics module" is a module including a graphics card to enhance processing of graphics data. An "optical drive module" is a module for reading and possibly writing to optical disks such as CDs, CDRs, CDRWs, DVDs, DVDRs, DVDRWs, and Blu-ray disks. An "I/O module" provides for communications with devices other than those included with the subject all-in-one computer; the devices can include hard disks, printers, faxes, flash memory cards, USB devices, etc. A "flash drive module" is a storage module that uses flash memory as the storage medium. A "UPS module" is a module that provides battery back-up in case of an AC power failure; such a module can allow time to save work before a computer shuts down in response to a power failure. Herein, the terms "vertical" and "lateral" are relative to the normal orientation of a display regardless of the actual orientation of the display.

The embodiments of the invention provide for different numbers of peripheral modules per assembly, and different form factors for the display, CPU module, and peripheral modules. Peripheral modules can receive power directly from the display or via the CPU module. Different support structures are provided for, including central base stands and plural support legs. Some embodiments provide separate connections for separate computers, while others do not.

The foregoing description, for purposes of explanation, has been described with reference to specific embodiments. However, the illustrative discussions are not intended to be exhaustive or to limit the invention to the precise forms disclosed. Many modifications and variations are possible in view of the disclosed teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A modular computer comprising:
   a display assembly including a display, said display having a front side and a back side, said display including a display screen on said front side and a docking station on said back side, said display assembly having a power input connector;
   a CPU module, said CPU module having a CPU docking connector for electrically connecting and physically attaching said CPU module to said docking station to form a display/CPU assembly, said CPU module having plural peripheral docking connectors; and
   peripheral modules each having connection means for physically attaching to and electrically communicating with said display/CPU assembly so that said peripheral modules contact said back side of said display screen, said peripheral modules receiving power from said power input connector through said display/CPU assembly.

2. A modular computer as recited in claim 1 wherein said display assembly has support means for supporting said display, said support means also supporting said peripheral modules when said peripheral modules are attached to said CPU module and said CPU module is attached to said docking station.

3. A modular computer as recited in claim 1 wherein said peripheral modules include at least one storage module and at least one communications module.

4. A modular computer system as recited in claim 1 wherein at least one of said peripheral modules is a graphics module with a graphics processor.

5. A modular computer as recited in claim 4 wherein said CPU module provides instructions to said graphics module and forwards images generated by said graphics module to said display assembly for presentation on said display screen.

6. A modular computer as recited in claim 1 wherein said CPU module has a vertical connection with said docking station and said peripheral modules have lateral connections with said CPU module.

7. A modular computer as recited in claim 1 wherein said display assembly includes a video-in connector for connecting to an external computer that is not attached to said docking station.

8. A modular computer as recited in claim 6 wherein said video-in connector is accessible when said CPU module is attached to said docking station.

9. A modular computer as recited in claim 8 wherein said display includes a source switch for selecting between said CPU module and said external computer as a source for images said display screen.

10. A modular computer as recited in claim 1 wherein at least one of said peripheral modules is a battery back-up module for providing power to said CPU module in the event of an AC power failure.

11. A modular computer as recited in claim 1 wherein at least one of said peripherals includes at least one computer-readable storage disk.

12. A method comprising:
    attaching a CPU module to a docking station that is part of and on back side of a display to form a display/CPU assembly so that said CPU module and said docking station are physically attached and electrically connected so that said CPU module can serve as a source for images to be display on a display screen on a front side of said display; and
    attaching peripheral modules to said display/CPU assembly so that they are electrically connected to said docking station through said CPU module and are physically contacting said CPU module and said back side of said display.

13. A method as recited in claim 12 wherein said engaging said CPU module with said docking station involves a substantially vertical motion of said CPU module and said attaching said peripheral modules involves substantially lateral motions of said peripheral modules.

14. A method as recited in claim 12 wherein a graphics module of said peripheral modules generates images and communicates them to said CPU module, which forwards them to said display to be presented on said screen.

15. A method as recited in claim 12 wherein, in the event of an AC power failure, a UPS module of said peripheral modules provides battery back-up to said CPU module.

* * * * *

UNITED STATES PATENT AND TRADEMARK OFFICE
CERTIFICATE OF CORRECTION

| | | |
|---|---|---|
| PATENT NO. | : 7,793,026 B1 | Page 1 of 1 |
| APPLICATION NO. | : 12/250047 | |
| DATED | : September 7, 2010 | |
| INVENTOR(S) | : Benjamin Abraham et al. | |

It is certified that error appears in the above-identified patent and that said Letters Patent is hereby corrected as shown below:

In column 4, line 43, in Claim 12, after "and on" insert -- a --.

Signed and Sealed this
Thirty-first Day of May, 2011

David J. Kappos
*Director of the United States Patent and Trademark Office*